(12) United States Patent
Johnson (10) Patent No.: US 7,264,401 B2
(45) Date of Patent: Sep. 4, 2007

(54) PANEL-MOUNTABLE OPTICAL FIBER SPLICE

(75) Inventor: Derek N. Johnson, North Richland Hills, TX (US)

(73) Assignee: Corning Cable Systems LLC, Hickory, NC (US)

( * ) Notice: Subject to any disclaimer, the term of this patent is extended or adjusted under 35 U.S.C. 154(b) by 141 days.

(21) Appl. No.: 10/857,318

(22) Filed: May 28, 2004

(65) Prior Publication Data

US 2005/0265666 A1 Dec. 1, 2005

(51) Int. Cl.
*G02B 6/36* (2006.01)
(52) U.S. Cl. .......................... 385/53; 385/137
(58) Field of Classification Search ................. 385/137, 385/53, 98
See application file for complete search history.

(56) References Cited

U.S. PATENT DOCUMENTS

| | | | | |
|---|---|---|---|---|
| 4,142,776 A * | 3/1979 | Cherin et al. .................. 385/71 |
| 4,247,163 A * | 1/1981 | Lumpp et al. ............... 385/136 |
| 4,676,589 A * | 6/1987 | Miyashita et al. ............ 385/65 |
| 4,755,018 A * | 7/1988 | Heng et al. .................... 385/65 |
| 5,040,867 A | 8/1991 | deJong et al. ................. 385/60 |
| 5,155,795 A | 10/1992 | Wasserman et al. ........ 385/138 |
| 5,333,222 A | 7/1994 | Belenkiy et al. .............. 385/70 |
| 5,341,448 A * | 8/1994 | Huebscher .................... 385/97 |
| 5,367,594 A | 11/1994 | Essert et al. ................... 385/70 |
| 5,394,496 A | 2/1995 | Caldwell et al. .............. 385/70 |
| 5,677,975 A * | 10/1997 | Burek et al. ................. 385/136 |
| 5,732,174 A | 3/1998 | Carpenter et al. ............ 385/72 |
| 5,774,612 A | 6/1998 | Belenkiy et al. .............. 385/72 |
| 5,857,045 A * | 1/1999 | Lee ............................... 385/70 |
| 5,984,532 A * | 11/1999 | Tamaki et al. ................. 385/70 |
| 5,993,071 A | 11/1999 | Hultermans ................... 385/70 |
| 6,022,150 A * | 2/2000 | Erdman et al. ................ 385/81 |
| 6,173,097 B1 | 1/2001 | Throckmorton et al. ...... 385/59 |
| 6,234,685 B1 * | 5/2001 | Carlisle et al. ................ 385/83 |
| 6,254,278 B1 | 7/2001 | Andrews et al. .............. 385/53 |
| 6,264,371 B1 | 7/2001 | Badeau et al. ................ 385/55 |
| 6,315,590 B1 | 11/2001 | Grois et al. ................. 439/248 |
| 6,379,054 B2 | 4/2002 | Throckmorton et al. ...... 385/66 |
| 6,422,764 B1 * | 7/2002 | Marrs ........................... 385/81 |
| 6,439,780 B1 * | 8/2002 | Mudd et al. ................... 385/83 |
| 6,457,873 B1 | 10/2002 | Heier et al. ................... 385/70 |
| 6,561,700 B1 | 5/2003 | Koren .......................... 385/58 |
| 6,715,928 B1 | 4/2004 | Matasek et al. .............. 385/56 |
| 2002/0041738 A1 | 4/2002 | Carberry et al. ............. 385/56 |
| 2003/0002802 A1 | 1/2003 | Trezza et al. ................. 385/53 |
| 2003/0169976 A1 | 9/2003 | Snyder ........................ 385/88 |
| 2004/0240830 A1 * | 12/2004 | Watte et al. ................ 385/137 |

FOREIGN PATENT DOCUMENTS

WO    WO 03/071329 A1    8/2003

* cited by examiner

*Primary Examiner*—Ellen E. Kim
(74) *Attorney, Agent, or Firm*—Jeffrey S. Bernard (57) ABSTRACT

A panel-mountable fiber optic splice is provided for interconnecting first and second optical fibers through an opening in a panel, bulkhead, wall or the like. The optical fiber splice includes a housing configured to be inserted into the opening in the panel, a splice holder disposed within an internal passageway defined by the housing, first and second splice members disposed within an internal cavity defined by the splice holder, and a cam member disposed about the splice holder for actuating the first and second splice members between a first, unactuated position for inserting the first and second optical fibers between the splice members and a second, actuated position for securing the first and second optical fibers between the splice members.

13 Claims, 9 Drawing Sheets

PANEL-MOUNTABLE OPTICAL FIBER SPLICE

BACKGROUND OF THE INVENTION

1. Field of the Invention

The present invention relates generally to optical fiber splices and, more particularly, to optical fiber splices adapted for installation in a panel or bulkhead.

2. Technical Background

Optical fibers are widely used in a variety of applications, including the telecommunications industry in which optical fibers are employed in telephony and data transmission. Due, at least in part, to the extremely wide bandwidth and the low noise operation provided by optical fibers, the variety of applications in which optical fibers are used is continuing to increase. For example, optical fibers no longer serve as merely a medium for long distance signal transmission, but are being increasingly routed directly to the home or, in some instances, directly to a desk or other work location.

With the ever increasing and varied use of optical fibers, it is apparent that efficient methods of coupling optical fibers, such as to other optical fibers, to a patch panel in a telephone central office or in an office building or to various remote terminals or pedestals, is required. Such panels or cabinets generally include a back-of-panel optical fiber (referred to herein as a "panel optical fiber") and a distribution optical fiber which extends from the panel front to, for example, another panel or an optical device. In a typical arrangement, each optical fiber connected to the panel is terminated by an optical fiber connector. Coupling the connectorized optical fibers, such as through a panel or bulkhead, requires that a separate adapter be provided to optically align the optical fibers along a common optical axis and to secure the opposing optical fiber connectors. The need for multiple connectors may make this method expensive and time consuming to employ. For example, mating ends of the connectors may require that the connector ferrules and optical fibers be polished in the field prior to insertion into the adapter. Although connector manufacturers have greatly reduced field assembly issues with the development of factory-assembled, field-installable connectors which incorporate pre-polished optical fiber stubs, such methods incorporate an additional splice between the connecting optical fiber and the optical fiber stub for each connector, which may increase the attenuation of the optical signal.

SUMMARY OF THE INVENTION

The present invention proposes a panel-mountable optical fiber splice for optically connecting the ends of a pair of opposing optical fibers. More particularly, the panel-mountable optical fiber splice according to the present invention is capable of providing an optical connection between opposing optical fibers through a bulkhead, wall, or other planar surface. Advantageously, the panel-mountable splice according to the present invention is used without the necessity of mounting optical fiber connectors on the ends of the optical fibers to be optically connected, whereby the cost of two additional connectors may be avoided, as well as the time and cost associated with mounting and polishing the additional connectors. Optical attenuation may also be reduced by eliminating the use of stub fibers that are commonly employed in field-installable connectors.

In one broad aspect of the invention, a panel-mountable optical fiber splice is provided which comprises a housing having first and second ends and defining a passageway extending longitudinally therebetween, a splice holder disposed within the housing passageway, the splice holder having first and second ends and defining a cavity extending longitudinally from the splice holder first end to an intermediate position within the splice holder, a first and second opposed splice member disposed within the splice holder cavity, and a cam member mounted on the splice holder movable between an initial position allowing the splice members to move apart to facilitate insertion of a first and second optical fiber between the first and second splice members, and a final position in which the cam member urges the splice members toward each other to clamp the first and second optical fibers therebetween.

In another broad aspect of the invention, an adapter for a panel-mountable optical fiber splice is provided, the adapter comprising a nut rotatably mounted on the adapter for engaging with a cam member.

In still another broad aspect of the invention a method of establishing an optical connection between first and second optical fibers is disclosed, the method comprising mounting a panel-mountable splice in a panel opening, the panel-mountable splice having a splice holder and a first and second splice member disposed within the splice holder, inserting a first optical fiber into a first end of the panel-mountable splice such that an end of the first optical fiber is disposed between the first and second splice members, inserting a second optical fiber into a second end of the panel-mountable splice such that an end of the second optical fiber is disposed between the first and second splice members abutting the first optical fiber end, and rotating a cam member relative to the panel-mountable splice so as to move the splice members relatively toward each other, thereby clamping the first and second optical fibers therebetween.

Additional features and advantages of the invention will be set forth in the detailed description which follows, and in part will be readily apparent to those skilled in the art from that description or recognized by practicing the invention as described herein, including the detailed description, the claims, and the appended drawings.

It is to be understood that both the foregoing general description and the following detailed description present various embodiments of the invention, and are intended to provide an overview or framework for understanding the nature and character of the invention as it is claimed. The accompanying drawings are included to provide a further understanding of the invention, and are incorporated in and constitute a part of this specification. The drawings illustrate various embodiments of the invention, and together with the description serve to explain the principles and operations of the invention.

DETAILED DESCRIPTION OF THE INVENTION

Detailed references will now be made to the drawings in which examples embodying this invention are shown. The drawings and detailed description provide a full and detailed written description of the invention, and of the manner and process of making and using it, so as to enable one skilled in the pertinent art to make and use the invention without undue experimentation as to the best mode known for carrying out the invention. However, the examples set forth in the drawings and detailed description are provided by way of explanation of the invention and not meant as a limitation of the invention. Thus, the invention is intended to encompass any modifications and variations of the following examples that come within the scope of the appended claims and their equivalents.

The detailed description uses numerical and letter designations to refer to features in the drawings. Like or similar designations in the drawings and description have been used to refer to like or similar parts of the invention.

Figure 1:
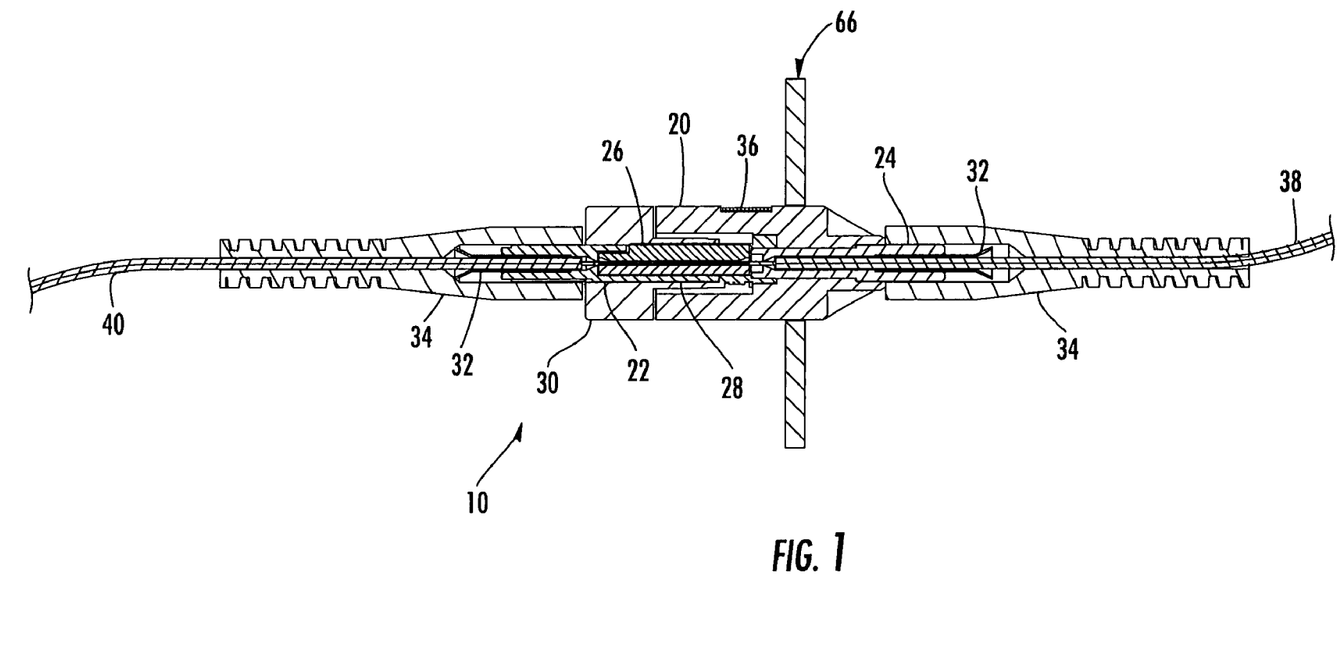
FIG. 1 is longitudinal cross section view of a panel-mountable optical fiber splice according to one embodiment of the invention.
Figure 2:
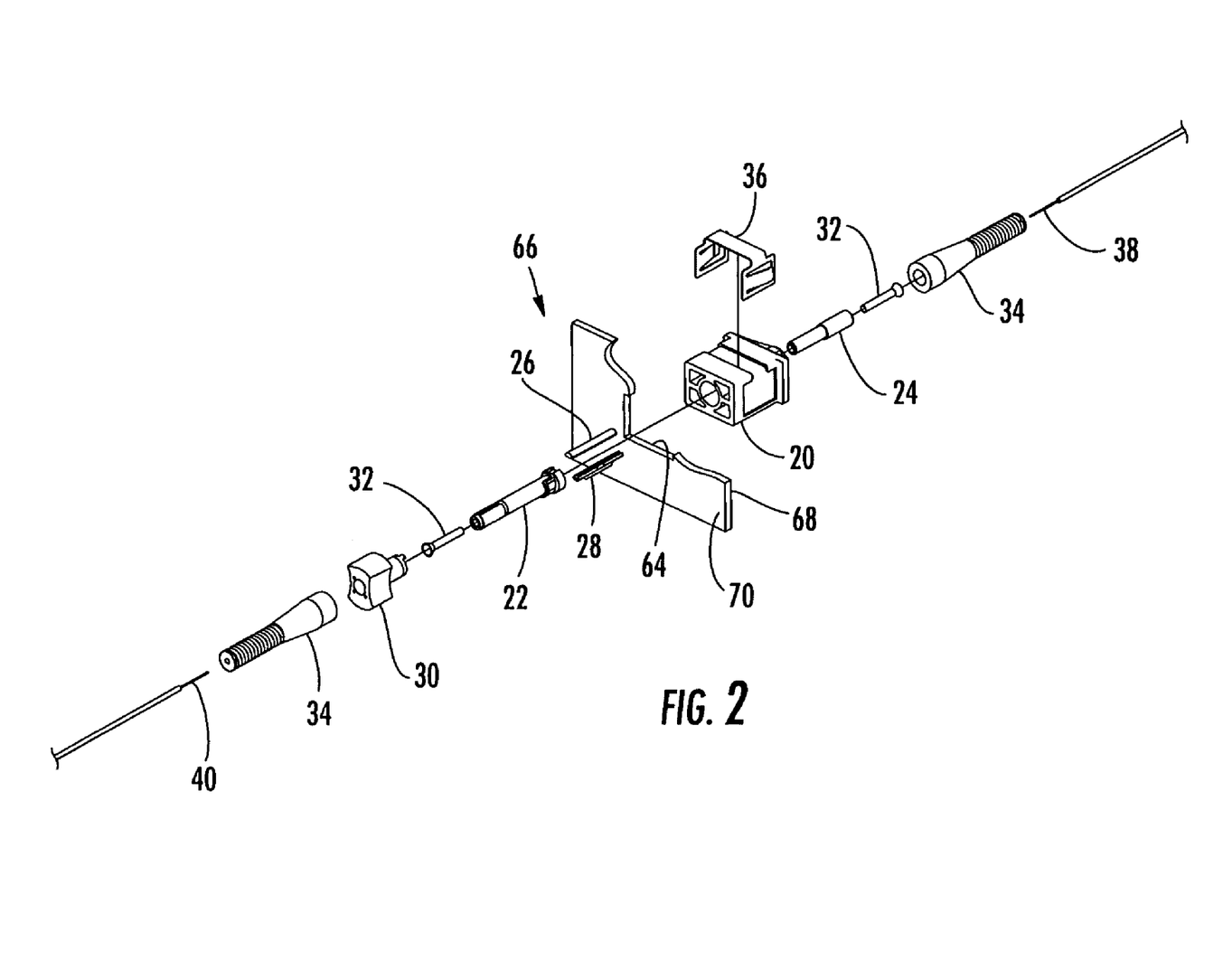
FIG. 2 is an exploded perspective view of the panel-mountable optical fiber splice of FIG. 1.

FIG. 1 illustrates an embodiment of a panel-mountable optical fiber splice 10 according to the present invention. The components which comprise panel-mountable optical fiber splice 10 include housing 20, splice holder 22, splice holder extension 24, first and second splice members 26 and 28, cam member 30 and crimp tubes 32. The panel-mountable splice 10 also comprises boots 34 and a fastener element 36. An exploded view of the panel-mountable optical fiber splice 10 is shown in FIG. 2. Also shown in FIGS. 1-2 are panel optical fiber 38 and distribution optical fiber 40. The panel and distribution optical fibers typically have an overall diameter (cladding diameter) of about 125 µm, and may have a protective coating comprising one or more layers, generally of an acrylate material, from about 245 µm to 900 µm in diameter disposed about the optical fibers.

Figure 3:
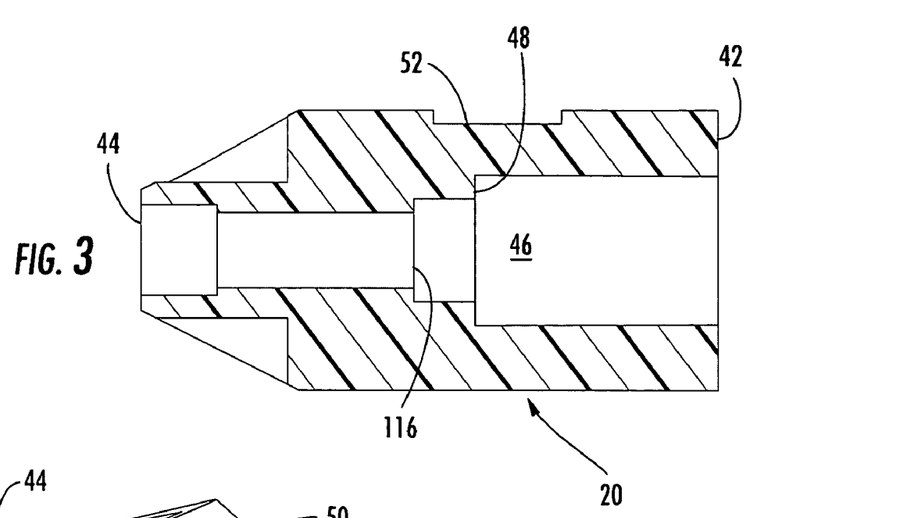
FIG. 3 is a longitudinal cross section view of a housing according to an embodiment of the invention taken along the line 3-3 in FIG. 5.
Figure 4:
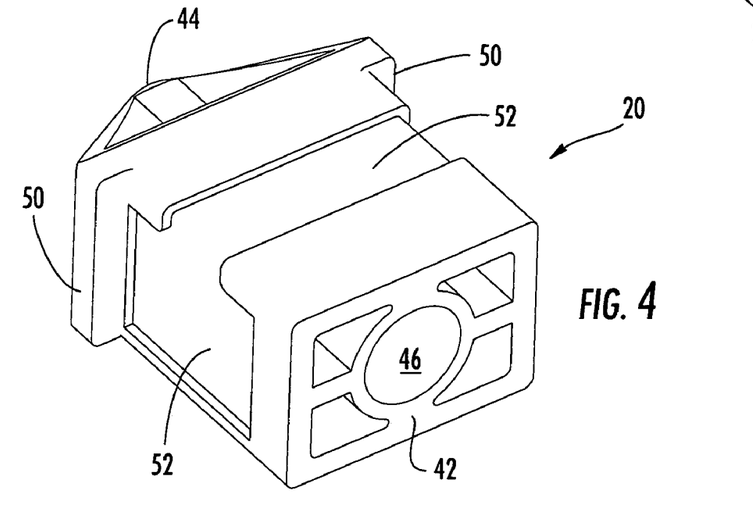
FIG. 4 is a perspective view of the housing of FIG. 3.
Figure 5:
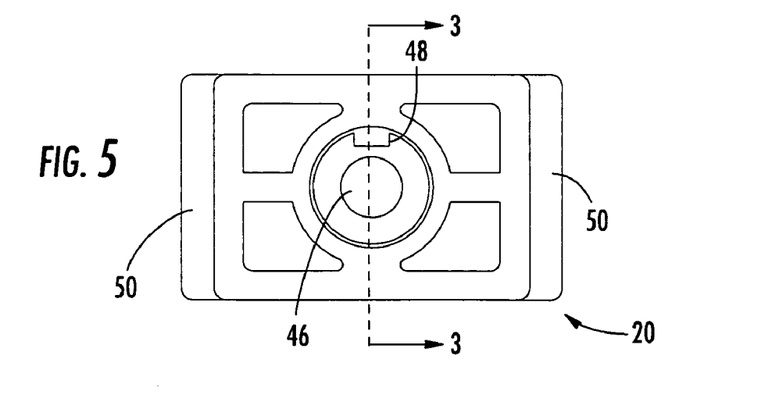
FIG. 5 is an end view of the housing of FIG. 3.

In the embodiment illustrated in FIG. 3, housing 20 comprises first and second ends 42 and 44, respectively, and a passageway 46 extending longitudinally therebetween. Preferably, passageway 46 has a non-constant diameter along its length, and may comprise, for example, a series of interconnected cylindrical chambers. Passageway 46 at first end 42 is sized to receive splice holder 22 and passageway 46 at second end 44 is sized to receive splice holder extension 24. Key 48 extends radially inward into passageway 46 at an intermediate position therein. Housing 20 further comprises flanges 50, as best illustrated in FIGS. 4-5, located on the outside surface of housing 20, such that when housing 20 is inserted into an opening in a panel, bulkhead, or wall, flanges 50 abut one side of the panel adjacent the opening and prevent housing 20 from passing completely through the opening. As used herein, "panel" should be construed to mean any panel, bulkhead, wall or similar boundary through which an optical connection between optical fibers may be desired.

Figure 6:
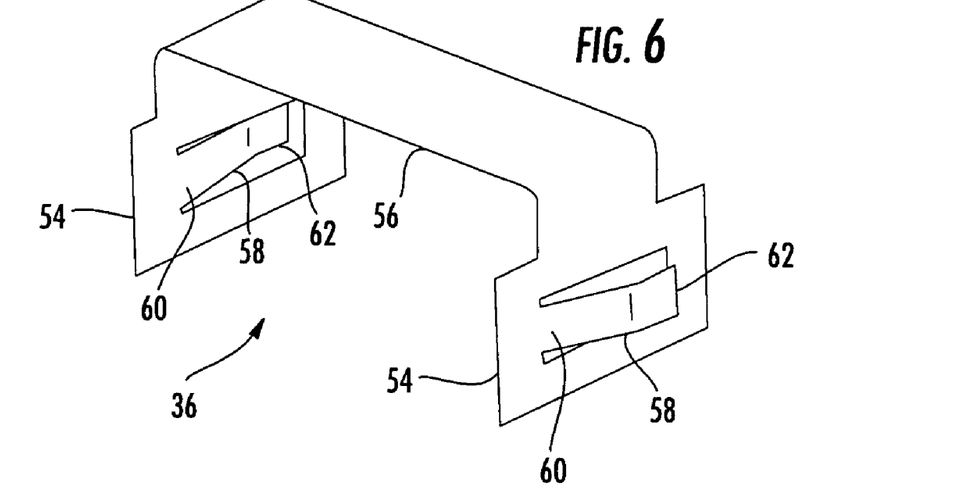
FIG. 6 is a perspective view of a fastener element according to an embodiment of the invention.

Also as shown in FIG. 4, housing 20 preferably comprises a shallow recessed region 52 on the outer surface thereof for accommodating a fastener element. Fastener element 36, as illustrated in FIG. 6, preferably comprises two wing portions 54 which are generally orthogonal to, and connected by, bridge portion 56. Fastener element 36 is preferably U-shaped and formed from a resilient material, such as spring metal or a plastic, which may be temporarily deformed, such as by spreading the wing portions 54 apart or away from each other, but will return to its initial shape when released. Fastener element 36 is preferably formed as a unitary structure. Each wing portion 54 includes a cantilevered tab portion 58 comprising a proximal end 60 connected to wing portion 54 and a distal end 62 which is raised relative to the plane of wing portion 54. The resiliency of fastener element 36 allows tab portions 58 to act as a spring such that distal end 62 of tab portions 58 may be depressed in a direction toward housing 20 from an initial position, but will thereafter return to the initial position away from housing 20 when released.

Fastener element 36 is mounted on the outside surface of housing 20 and accommodated by shallow recessed region 52 such that bridge portion 56 straddles housing 20.

Recessed region 52 prevents fastener element 36 from movement relative to housing 20, such as sliding longitudinally along housing 20.

Returning to FIG. 2, when housing 20 is inserted into opening 64 in panel 66, tab portions 58 are depressed inward toward housing 20 by the edges of opening 64, thereby allowing housing 20 to be inserted until tab portions 58 clear side 70 of panel 66, whereupon tab portions 58 snap back to their initial position and secure housing 20 within opening 64. Thus, housing 20 is prevented from being unintentionally withdrawn from opening 64 by flanges 50 and tabs 58. Housing 20 may be withdrawn from opening 64 by simultaneously depressing the distal ends 62 of tabs 58, such that the distal ends 62 are compressed inward toward housing 20, and then withdrawing housing 20.

Figure 7:
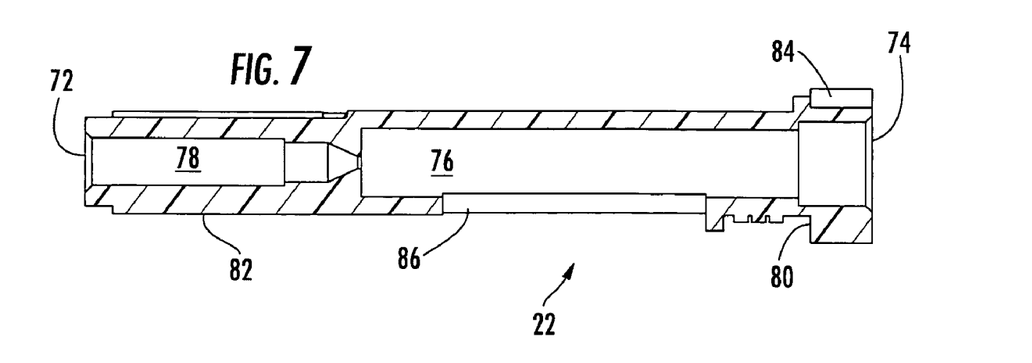
FIG. 7 is a longitudinal cross section view of a splice holder according to an embodiment of the invention.
Figures 8, 9:
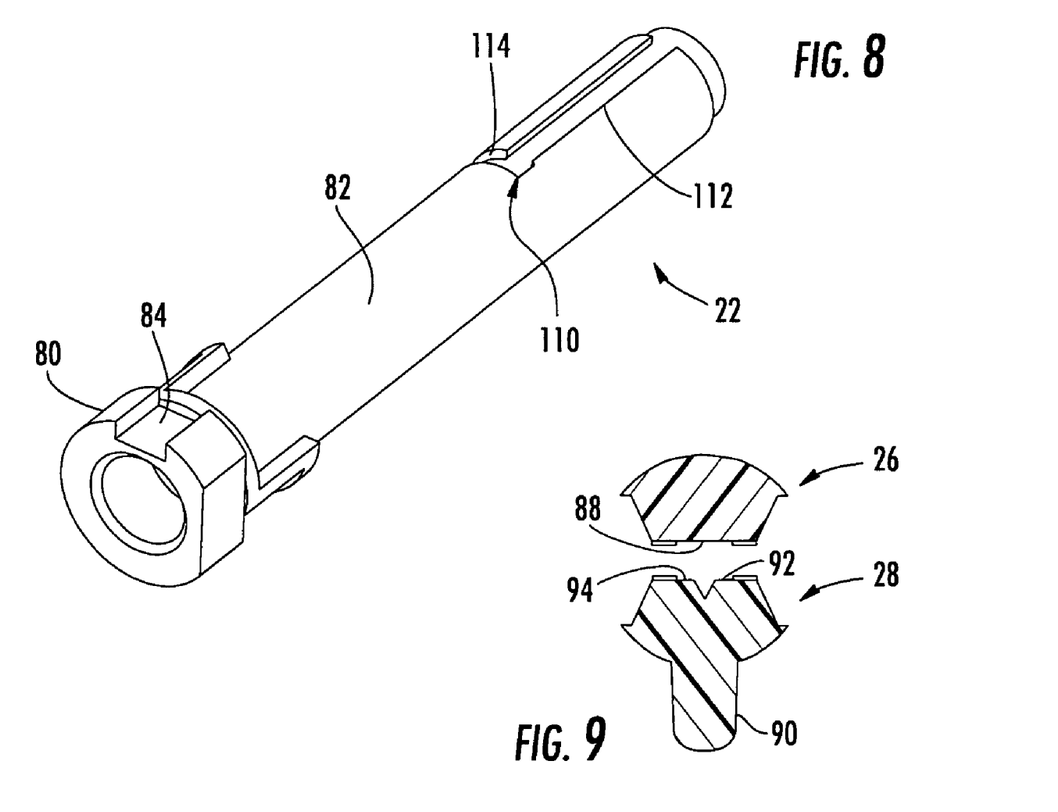
FIG. 8 is a perspective view of the splice holder of FIG. 7.
FIG. 9 is an axial cross section view of first and second splice members according to an embodiment of the invention.

Splice holder 22, shown in FIGS. 7-8, includes first and second ends 72 and 74 respectively. A cavity 76 extends longitudinally from second end 74 toward first end 72. A passageway 78 extends longitudinally from splice holder first end 72 toward second end 74 and is in communication with cavity 76 at an intermediate position within splice holder 22. Splice holder 22 also comprises a flange 80 located on the outside surface 82 of splice holder 22 adjacent to second end 74, the flange including a groove 84 extending lengthwise relative to the splice holder for slidably engaging with key 48 of housing 20. Engagement of key 48 with groove 84 prevents splice holder 22 from rotating relative to housing 20 after splice holder 22 has been inserted into housing 20. Splice holder 22 also includes an opening, or window 86 extending between outside surface 82 and cavity 76 for receiving a portion of second splice member 28.

Figure 10:
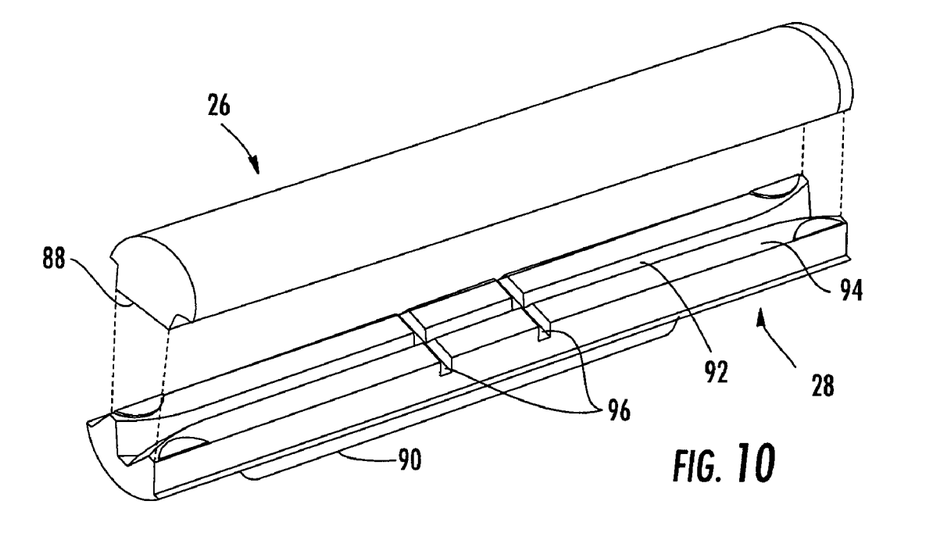
FIG. 10 is an exploded perspective view of the first and second splice members of FIG. 9.

Splice members 26 and 28, shown in an axial cross section view in FIG. 9, are inserted into cavity 76 through splice holder second end 74 such that a portion of second splice member 28 extends through window 86. First splice member 26 comprises a flat side 88 opposite second splice member 28. Second splice member 28 is generally opposite window 86 when properly positioned within splice holder 22. As depicted in FIG. 9, second splice member 28 comprises a projection, or keel portion 90 which engages with and protrudes through window 86 when splice members 26, 28 are inserted into splice holder cavity 76. Second splice member 28 also defines groove 92 extending longitudinally along the length of second splice member 28 on side 94 opposite keel portion 90 and opposing first splice member 26. Alternatively, groove 92 could be formed in the opposing face 88 of first splice member 26, and a flat face could be formed on opposing side 94 of second splice member 28. Groove 92 is shown in FIG. 9 as generally V-shaped. For splice members having a V-shaped groove, the V-shaped groove preferably defines an interior angle of about 60°. However it should be understood that groove 92 could define other interior angles, or other shapes capable of supporting an optical fiber without departing from the scope of the present invention. To facilitate optical connection of panel optical fiber 38 and distribution optical fiber 40, a medial portion of groove 92 may be filled with a refractive index matching gel prior to insertion of the optical fibers therebetween. Further, second splice member 28 may define one or more laterally extending vents 96, best seen in FIG. 10, to restrict the index matching gel to the medial portion of groove 92 and to limit or prevent the migration of the refractive index matching gel to the ends of splice members 26, 28. Groove 92 may also be flared at the ends thereof to facilitate guiding optical fibers 38 and 40 into groove 92.

Cam member 30 is mounted on splice holder 22 in an initial position generally axially aligned with splice members 26, 28 as shown in FIG. 1. As better illustrated in FIGS. 11-13, cam member 30 defines a longitudinally extending passageway 98 that is sized to receive and therefore be mounted upon splice holder 22. Cam member 30 also comprises first end 100 and second end 102, first and second ends 100, 102 being in communication with passageway 98. In order to actuate splice members 26, 28, at least a portion of passageway 98 defined by cam member 30 is preferably noncircular and comprises a major axis 104 and a minor axis 106, as illustrated by FIG. 12. As evidenced by the thinner sidewall immediately adjacent the major axis 104 of cam member 30, the portions of passageway 98 adjacent major axis 104 have a smaller radius than the radius of those portions of passageway 98 immediately adjacent minor axis 106. Moreover, passageway 98 is defined by cam member 30 such that the smaller radius of passageway 98 immediately adjacent major axis 104 smoothly transitions into the larger radius of passageway 98 immediately adjacent minor axis 106. Cam member 30 according to the present embodiment preferably comprises an index mark 107 located on the outside surface thereof for indicating the orientation of the cam member, and therefore the condition of the cam member, i.e. in the first, unactuated position, or the second, actuated position. Index mark 107 may be, for example, a raised region on the outside surface of cam member 30. Index mark 107 could also be a groove, or other permanent marking suitable for the purpose.

Figures 14, 15, 24:
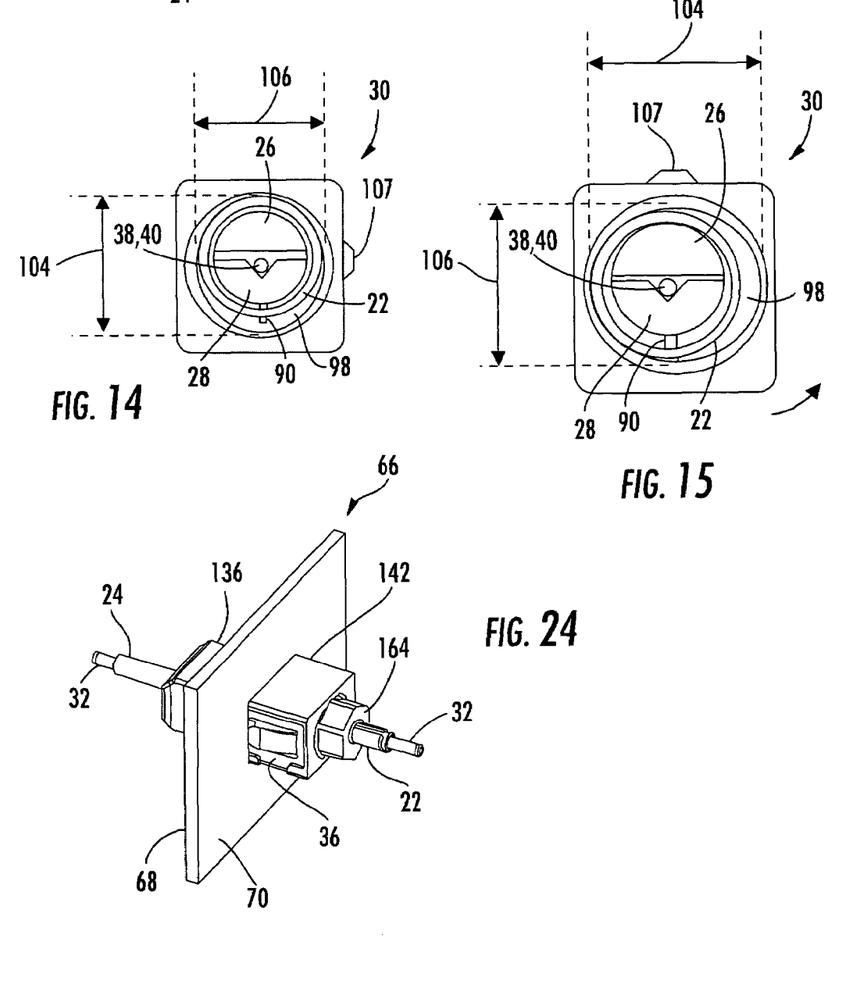
FIG. 14 is an end view of the cam member of FIG. 11 taken along the line 14-14 in FIG. 11 shown mounted on the splice holder in the first, unactuated position.
FIG. 15 is an end view of the cam member of FIG. 11 taken along the line 15-15 in FIG. 11 shown mounted on the splice holder in the second, actuated position.
FIG. 24 is a perspective view of the panel-mountable optical fiber splice of FIG. 20 shown assembled and mounted in a panel opening.

As shown by FIGS. 14 and 15, cam member 30 of this advantageous embodiment is mounted upon splice holder 22 such that exposed keel portion 90 of second splice member 28 is aligned with major axis 104 of cam member passageway 98. As a result, cam member 30 can be readily mounted on splice holder 22 while splice members 26 and 28 remain unactuated. Once cam member 30 has been mounted upon splice holder 22, however, cam member 30 can be rotated relative to splice holder 22 from the first unactuated position to the second actuated position so as to move the exposed keel portion 90 of second splice member 28 from a position aligned with major axis 104 of passageway 98 to a position aligned with minor axis 106 of passageway 98. Due to the smaller dimensions of passageway 98 along minor axis 106, cam member 30 operably contacts exposed keel portion 90 of second splice member 28 following rotation of cam member 30 relative to splice holder 22. As a result of this contact, cam member 30 actuates splice members 26, 28, such as by urging first and second splice members 26, 28 toward one another, so as to mechanically splice panel optical fiber 38 and distribution optical fiber 40 together therebetween. As used herein, "mechanically splice" is intended to mean the operation of optically connecting a first optical fiber to a second optical fiber, such as a panel optical fiber to a distribution optical fiber, by mechanical means, such as by securing the two fibers with their respective end faces in abutment with each other along a common optical axis. Preferably, such optical connection is performed with minimal optical loss. In a preferred embodiment, at least a portion of the outside surface of cam member 30 may be adapted to be easily rotated by hand.

Figure 11:
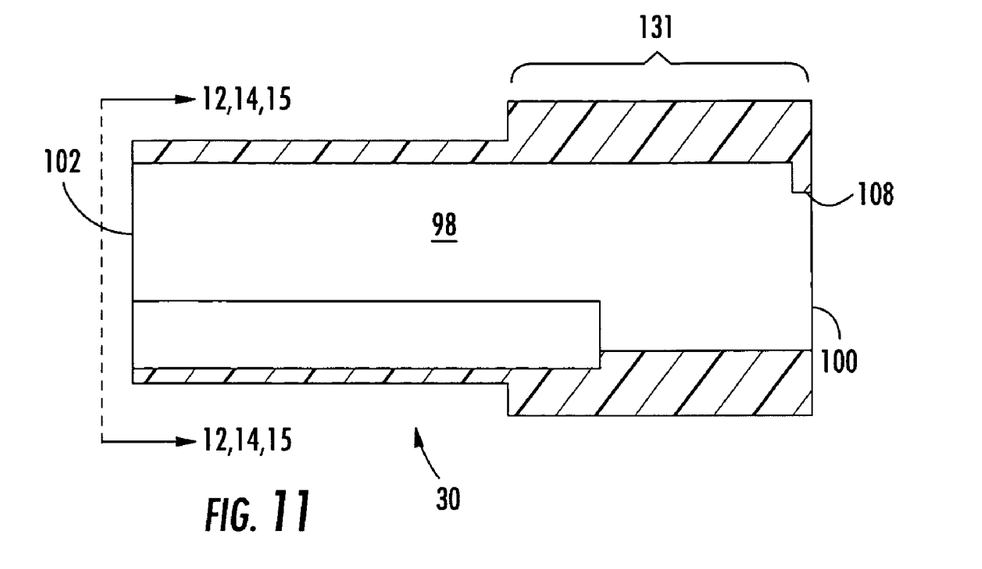
FIG. 11 is a longitudinal cross section view of a cam member according to an embodiment of the invention.
Figure 12:
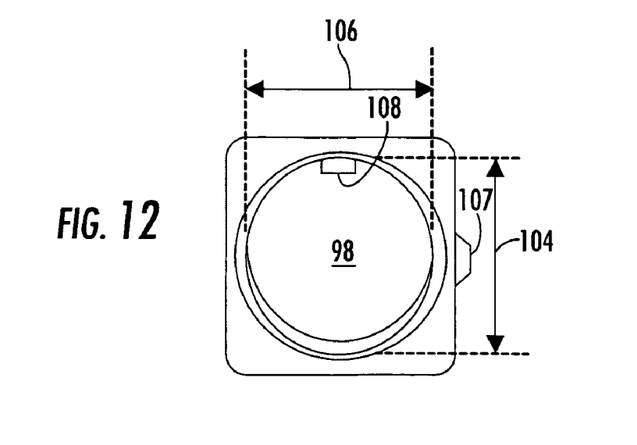
FIG. 12 is an end view of the cam member of FIG. 11 taken along the line 12-12 in FIG. 11.
Figure 13:
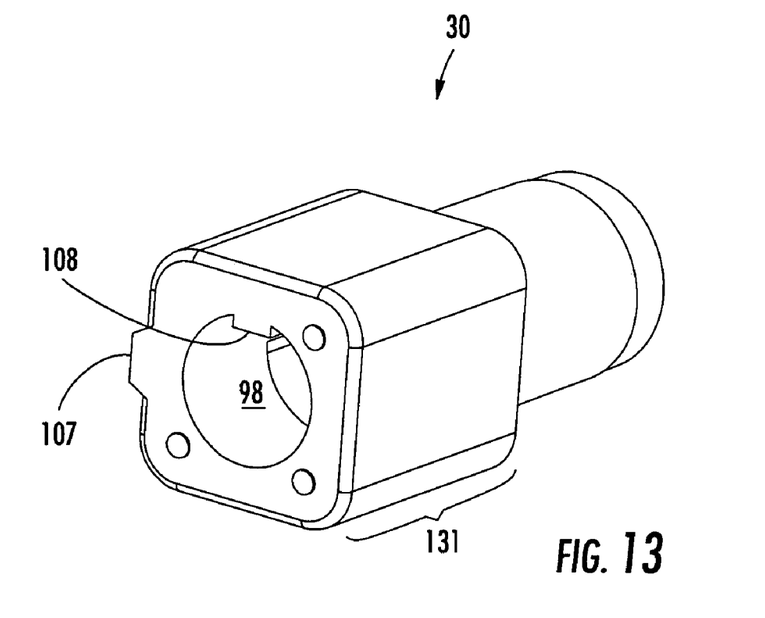
FIG. 13 is a perspective view of the cam member of FIG. 11.

As depicted in FIGS. 11-13, cam member 30 of one advantageous embodiment of the present invention includes an inwardly extending projection 108. While the inwardly extending projection 108 is adjacent one end of cam member 30 in the illustrated embodiment, the inwardly extending projection 108 can be positioned at other points along the lengthwise extending passageway 98, if so desired. As shown in FIG. 8, the outer surface 82 of splice holder 22 of this advantageous embodiment also preferably defines a groove 110 for receiving the inwardly extending projection 108. By confining the inwardly extending projection 108 within groove 110, splice holder 22 can guide cam member 30 as cam member 30 is initially mounted upon splice holder 22 (i.e. slid lengthwise relative to splice holder 22) and further as cam member 30 is subsequently rotated relative to splice holder 22 from the first, unactuated position to the second, actuated position.

In the embodiment illustrated in FIG. 8, the groove 110 defined by splice holder 22 is generally L-shaped. As such, groove 110 includes a first section 112 that extends lengthwise along a portion of splice holder 22 from first end 72 of splice holder 22 to a medial portion of splice holder 22. In addition, groove 110 includes a second section 114 that extends circumferentially about a portion, such as one-quarter, of splice holder 22. As such, the inwardly extending projection 108 of cam member 30 is moved through the first section 112 of groove 110 as cam member 30 is slid lengthwise relative to splice holder 22 when cam member 30 is mounted upon splice holder 22. Thereafter, the inwardly extending projection 108 of cam member 30 is moved through the second section 114 of groove 110 as cam member 30 is rotated relative to splice holder 22. First and second sections 112, 114 of groove 110 of this embodiment are preferably orthogonal, and intersect in the medial portion of splice holder 22 to permit cam member 30 to be rotated relative to splice holder 22 once cam member 30 has been fully mounted upon splice holder 22.

As described above, cam member 30 is mounted upon splice holder 22 in the first unactuated position by moving the inwardly extending projection 108 through the first section 112 of groove 110. As also described above, cam member 30 transitions from the first, unactuated position to the second, actuated position as cam member 30 is rotated relative to splice holder 22 by moving the inwardly extending projection 108 through the second section 114 of groove 110. In the embodiment in which passageway 98 defined by cam member 30 includes a major axis 104 and a minor axis 106, cam member 30 and splice holder 22 are preferably designed such that exposed keel portion 90 of second splice member 28 is aligned with major axis 104 of cam member passageway 98 as inwardly extending projection 108 of cam member 30 is moved through first section 112 of groove 110. Correspondingly, cam member 30 and splice holder 22 of this advantageous embodiment are also preferably designed such that the exposed keel portion 90 of second splice member 28 is moved along the inside surface of cam member 30 from alignment with the major axis 104 of passageway 98 to alignment with the minor axis 106 of passageway 98 as inwardly extending projection 108 is moved through the second section 114 of groove 110. By engaging exposed keel portion 90 of second splice member 28 with the inside surface of cam member 30 along the minor axis 106 of passageway 98, splice components 26, 28 are actuated, such as by urging first and second splice members 26, 28 toward one another, so as to mechanically splice panel optical fiber 38 and distribution optical fiber 40, as described above.

By confining the inwardly extending projection 108 of cam member 30 to the generally L-shaped groove 110, the panel-mountable optical fiber splice 10 of this advantageous embodiment of the present invention insures that cam member 30 is fully mounted upon splice holder 22 prior to actuating splice members 26, 28 by rotating cam member 30 relative to splice holder 22, thereby providing complete or full actuation of splice members 26, 28. In addition, the optical fiber splice 10 of this advantageous embodiment prevents cam member 30 from being removed from splice holder 22 without first being moved to an unactuated position by rotating cam member 30 in the opposite direction relative to splice holder 22 so as to move the inwardly extending projection 108 from second section 114 of groove 110 in which splice members 26, 28 are actuated to first section 112 of groove 110 in which splice members 26, 28 are unactuated. Thus, the optical fiber splice 10 of this advantageous embodiment prevents inadvertent damage to the components of the fiber optic connector which could otherwise possibly be incurred by removing cam member 30 from splice holder 22 while in the actuated position.

Figure 16:
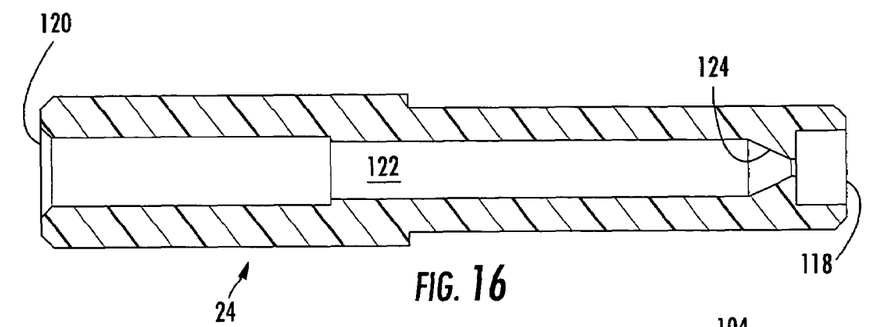
FIG. 16 is a longitudinal cross section view of a splice holder extension according to an embodiment of the invention.

As illustrated in FIGS. 1-3, splice holder second end 74 is inserted into passageway 46 through first end 42 of housing 20 until second end 74 of splice holder 22 abuts shoulder 116 and key 48 slidably engages with groove 84. Splice holder extension 24 (FIG. 1 and FIG. 16) is then inserted into housing passageway 46 through housing second end 44 and is coupled to splice holder 22. As shown in FIG. 16, splice holder extension 24 comprises first and second ends 118 and 120, respectively, and passageway 122 extending longitudinally therebetween. Preferably, a portion 124 of passageway 122 is sloped inward in a generally conical configuration to guide panel fiber 38 from passageway 122 into splice holder 22. In a preferred embodiment, splice holder extension 24 is coupled to splice holder 22 by inserting splice holder extension first end 118 into splice holder cavity 76 through splice holder second end 74, splice holder second end 74 being sized to receive splice holder extension 24. Splice holder extension 24 is preferably retained in splice holder cavity 76 by an interference fit between splice holder 22 and splice holder extension 24, although it should be recognized that splice holder extension 24 could be retained within splice holder 22 by an adhesive, such as by an epoxy adhesive or the like, or by cooperative engagement elements.

When cam member 30 has been fully mounted on splice holder 22, and with splice holder 22 inserted into housing 20 such that key 48 is engaged with groove 84, at least a portion of cam member 30 extends into housing passageway 46 through housing first end 42.

Both first end 72 of splice holder 22 and second end 120 of splice holder extension 24 are sized to receive crimp tubes 32 into passageway 78 and passageway 122, respectively. Crimp tubes 32, shown in FIG. 17, comprise first end 126, second end 128 and an axial bore 130 extending therebetween. Preferably the second end 128 of crimp tube 32 is flared so that an optical fiber, such as panel fiber 38 or distribution fiber 40, may be more easily inserted into the crimp tubes. Crimp tubes 32 may be formed from any material suitable for the purpose, including copper, stainless steel, aluminum or brass. When panel optical fiber 38 or distribution optical fiber 40 has been inserted into a crimp tube, the coated portion of the respective optical fiber may be securely engaged by crimping the respective crimp tube 32 about the coated portion of the optical fiber.

Once splice members 26, 28 have been actuated, such as by mounting cam member 30 upon the splice holder 22 and thereafter rotating cam member 30 relative to splice holder 22 and crimp tubes 32 crimped to securely engage the coated portion of the panel and/or distribution fibers 38, 40, boots 34, which have been previously mounted upon optical fibers 38 and 40, may be assembled over the ends of splice holder 22 and splice holder extension 24, as shown in FIG. 1.

Use of the panel-mountable optical fiber splice 10 of the present embodiment is simple and straight forward. Splice members 26 and 28 are inserted into cavity 76 through splice holder second end 74, and, if desired, refractive index matching gel may be injected into cavity 76 between splice members 26 and 28 at an intermediate position along the length thereof. Splice holder second end 74 is then inserted into housing passageway 46 through housing first end 42 and key 48 engaged with groove 84. Splice holder extension first end 118 is then inserted into housing passageway 46 through housing second end 44 and coupled with splice holder 22, such as by inserting splice holder extension first end 118 into splice holder cavity 76 through splice holder second end 74. Cam member 30 may thereafter be mounted on splice holder 22 in an initial position wherein first and second splice members 26, 28 are unactuated. Crimp tubes 32 may then be inserted into splice holder passageway 78 through splice holder first end 72, and into splice holder extension passageway 122 through splice holder extension second end 120 and secured with an adhesive, such as an epoxy adhesive, or the like. Fastener element 36 may then be mounted on housing 20.

The order of assembly may be varied without departing from the scope of the invention. For example, splice holder extension 24 could be inserted into housing 20 prior to inserting splice holder 22 into housing 20. Alternatively, splice holder extension 24 and housing 20 could be combined into a single part and splice holder 22 inserted into the combined splice holder extension/housing. Likewise, fastener element 36 could be mounted on housing 20 at any time prior to the insertion of housing 20 into a panel opening. The order of assembly is not critical so long as such assembly of one component does not preclude the assembly of a subsequent component. For example, in the embodiment depicted in FIG. 1, splice members 26, 28 must be inserted into splice holder 22 before splice holder 22 may be inserted into housing 20. Furthermore, the assembly procedure above may be accomplished in the field, or, preferably, in a factory environment.

When preparing for a splice between panel fiber 38 and distribution fiber 40, a portion of the coating disposed about panel fiber 38 is removed by methods known in the art, leaving a length of uncoated (bare) panel fiber. The bare length of panel fiber 38 is prepared by cleaving the end of the fiber to produce a good end finish. The end of panel fiber 38 is cleaved, for example with a cleave angle of about 8 degrees or a cleave angle of less than about 1 degree from perpendicular to the fiber axis. The uncoated end of panel fiber 38 is then inserted through the crimp tube located in splice holder extension 24 such that the bare end of panel fiber 38 extends to an intermediate position between the first and second splice members 26, 28. The splice holder extension crimp tube 32 may then be crimped about the coated portion of panel fiber 38, as is known in the art, to secure the panel fiber 38. Next, a boot 34, which has been previously mounted on panel fiber 38, may be secured to splice holder extension 24 with an interference fit, for example, to provide strain relief to panel fiber 38. Housing 20 may thereafter be inserted into the panel opening 64, whereupon fastener element tabs 58 are depressed by the edges of the opening. When the housing has been inserted to a point at which the distal ends 62 of tabs 58 have cleared the panel, tabs 58 snap back to their initial position, thus capturing the panel 66 between the housing flanges 50 and the fastener tabs 58. Alternatively, housing 20, including splice holder 22, splice holder extension 24, splice members 26, 28, cam member 30, and crimp tubes 32 may be inserted and secured in the panel opening 64 prior to inserting and securing panel fiber 38. Once housing 20 has been thus secured within the panel opening 64, distribution fiber 40 may then be prepared in a manner similar to preparation of the panel fiber 38, wherein distribution fiber 40 is preferably prepared by cleaving the fiber, for example with a cleave angle of about 8 degrees or a cleave angle of less than about 1 degree. Distribution fiber 40 is then inserted through the crimp tube 32 located in the first end of splice holder 22. Distribution optical fiber 40 is guided by groove 90 in second splice member 28 to a position in abutment with panel fiber 38, and securely engaged by crimping the crimp tube 32 about the coated portion of distribution fiber 40. Cam member 30, which has previously been mounted on splice holder 22 in the first, unactuated position, may then be rotated relative to splice holder 22 such as by the installer gripping and rotating cam member 30 by hand relative to splice holder 22. A boot 34, which has been previously mounted on the distribution fiber may then be secured to splice holder 22, with an interference fit for example, to provide strain relief to distribution fiber 40.

Figures 17, 18, 19, 20:
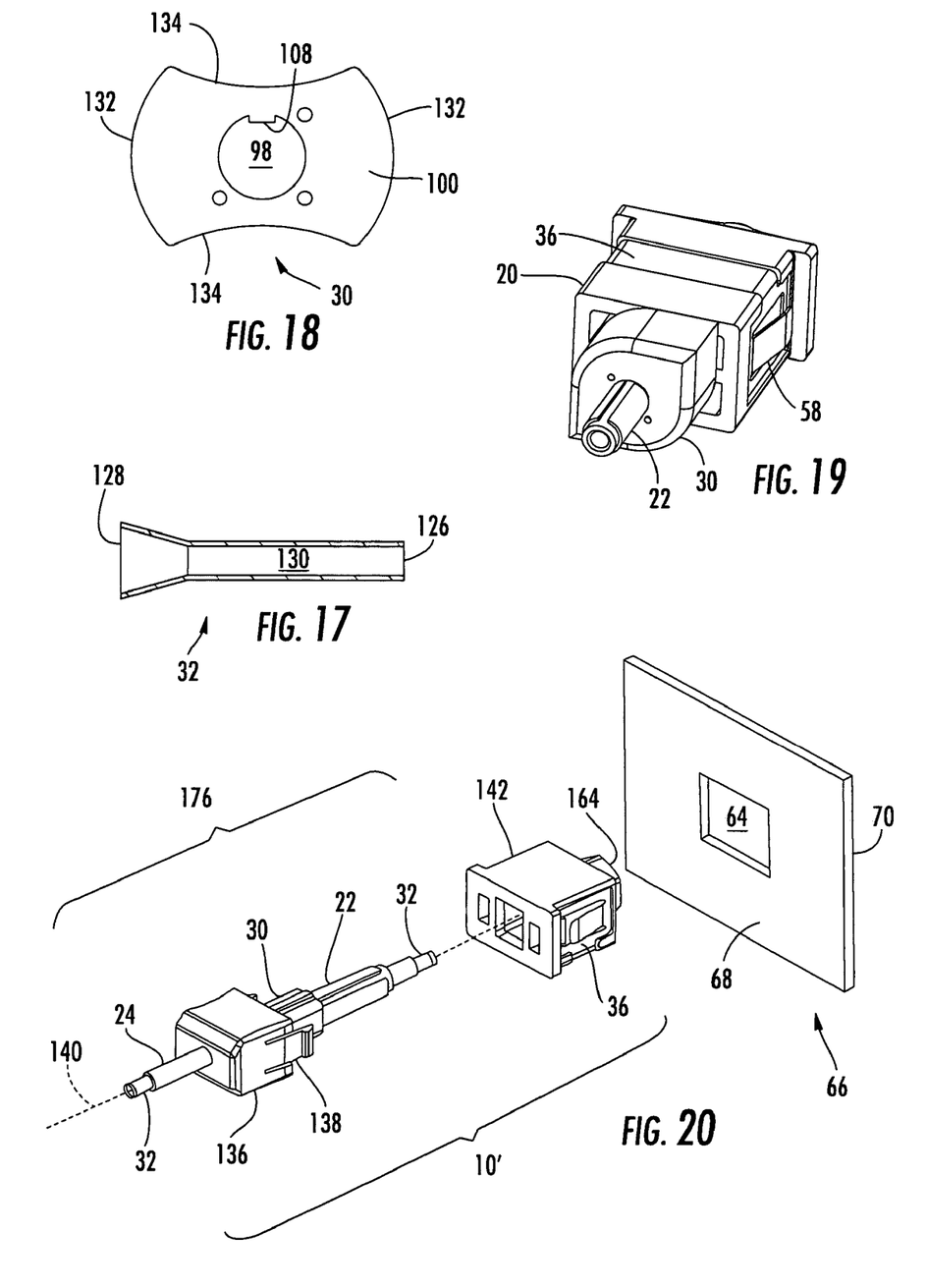
FIG. 17 is a longitudinal cross section of a crimp tube according to an embodiment of the invention.
FIG. 18 is an enlarged end view of a cam member according to another embodiment of the invention showing the cam member of FIG. 1 with a portion of the outside surface adapted to facilitate rotation of the cam member relative to the splice holder.
FIG. 19 is a perspective view of still another embodiment of the cam member showing a portion of the outside surface with a different shape to facilitate rotation of the cam member relative to the splice holder.
FIG. 20 is an exploded view of another embodiment of a panel-mountable optical fiber splice according to the invention.

Although portion 131 of the outside surface of cam member 30 in the embodiment shown in FIGS. 12-15 has a generally rectangular shape, and preferably a generally square shape, to facilitate rotation of cam member 30 relative to splice holder 22, cam member portion 131 may be formed in a shape which may be more easily gripped by an operator. For example, FIG. 18 depicts an outside shape seen from cam member end 100 generally comprising two convex surfaces positioned opposite each other and connected to two concave surfaces also positioned opposite each other, forming, in rotation about the cam member, a first convex shape 132 followed by a first concave shape 134 which in turn is followed by a second convex shape 132 followed by a second concave shape 134. In another embodiment, shown in FIG. 19, cam member 30 comprises two convex shapes joined such that the cam member viewed from cam member first end 100 has an eye-like appearance. It should be recognized that other shapes are possible to facilitate hand rotation of cam member 30 by an operator.

Figures 21, 22:
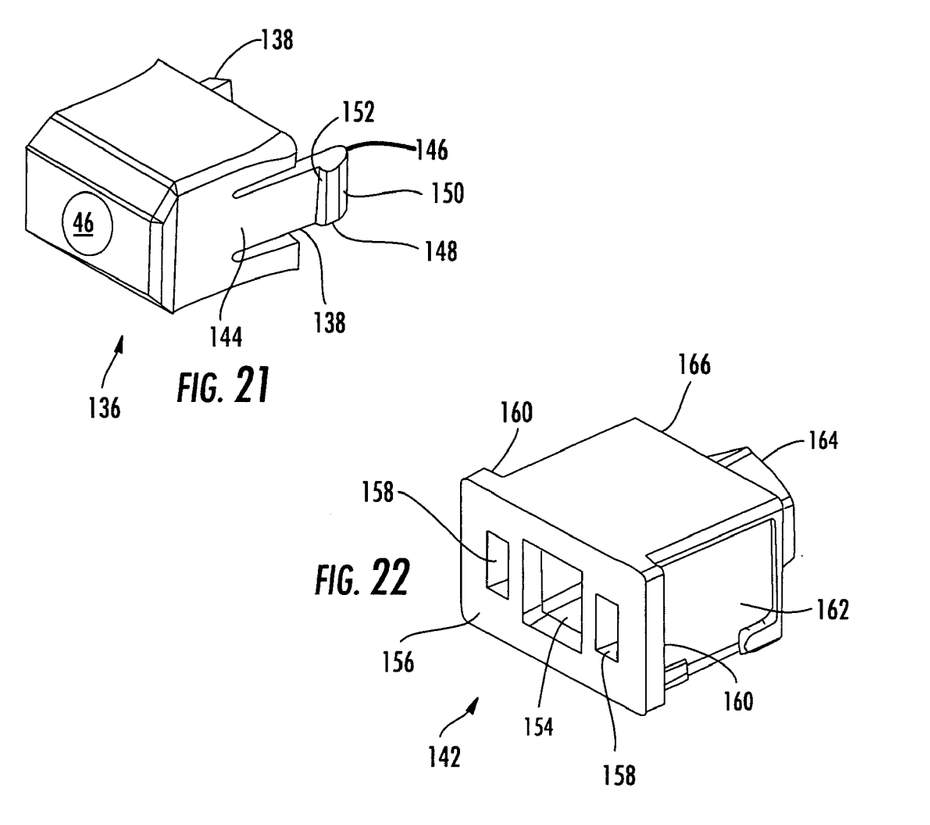
FIG. 21 is a perspective view of another embodiment of a housing according to the present invention.
FIG. 22 is a perspective view of an adapter according to another embodiment of the invention.

In a further embodiment of the panel-mountable optical fiber splice, generally designated as 10' in FIG. 20, splice holder 22, splice holder extension 24, first and second splice members 26 and 28 (not shown), cam member 30, crimp tubes 32, and boots 34 (not shown) are identical to those described in the previous embodiment. Splice holder 22 and splice holder extension 24 are assembled into housing 136 in generally the same manner as previously described for housing 20. Housing 136, into which the foregoing components are assembled, has identical internal features as housing 20 in the previous embodiment. However, housing 136 according to the present embodiment further comprises a pair of latching arms 138 extending from housing 136 generally parallel to optical axis 140 for engaging with adapter 142. As illustrated in FIG. 21, latching arms 138 include a proximal end 144 attached to the outer surface of housing 136 and a distal end 146 extending rearward from the outer surface of housing 136. Latching arms 138 preferably include a hook element 148 located adjacent distal end 146 of each latching arm 138. Hook elements 148 may have chamfered edges 150 to provide for easy insertion of latching arms 138 into adapter 142, and hook elements 148 preferably include a flat side 152 for engagement with adapter 142.

Adapter 142, as shown in FIGS. 20, 22 defines an opening 154 at first end 156 sized to receive splice holder 22 and cam member 30. Adapter 142 further comprises a plurality of openings 158, typically on opposite sides of opening 154, at adapter first end 156 for receiving latching arms 138, one opening for each latching arm. In addition, adapter 142 includes flanges 160 located on the outside surface of adapter 142 such that when adapter 142 is inserted into an opening in a panel, bulkhead, or wall, flanges 160 abut the panel adjacent the sides of the opening and prevent adapter 142 from passing completely through the opening. Thus, flanges 160 function as positive stops to locate the adapter 142 within an opening.

Adapter 142 further includes shallow recessed region 162 on the outside surface of adapter 142 for accommodating fastener element 36. Fastener element 36 performs the same function on adapter 142 as in the previous embodiment for housing 20. That is, when adapter 142 is inserted into a panel opening 64, the panel 66 is captured between flanges 160 and fastener element tabs 58. When adapter 142 is inserted into opening 64, tabs 58 are biased inward toward adapter 142, allowing the insertion of adapter 142 into panel opening 64 until tabs 58 clear side 70 of panel 66. When tabs 58 are clear of panel 66, tabs 58 snap back to their initial position and secure adapter 142 within the panel opening 64 by capturing the panel 66 between flanges 160 on side 68 of the panel 66 and tabs 58 on side 70 of the panel 66, thus securing adapter 142.

Figure 23:
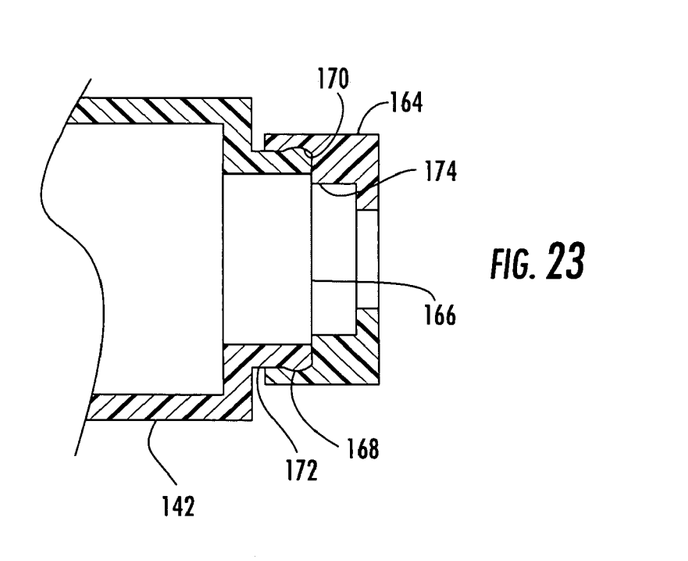
FIG. 23 is a partial cross section view of the adapter of FIG. 22 showing the attachment of the rotatably mounted nut.

Adapter 142 may also include a nut 164 for engaging with cam member 30. Nut 164 is rotatably mounted on adapter 142, and has an inside surface adapted to engage with at least a portion of the outside surface of cam member 30, such that when cam member 30 has been inserted into nut 162, cam member 30 may be rotated relative to splice holder 22 by rotating nut 164 relative to adapter 142. For example, second end 166 of adapter 142 and the inside surface of nut 164 may include cooperative engagement elements 168 and 170 respectively, as shown in FIG. 23, wherein engagement element 168 may comprise a ridge adjacent end 166 and about the outside surface of collar 172, and engagement element 170 may comprise a groove about the inside circumference of nut 164. In this embodiment, nut 164 is snapped onto collar 172 such that nut 164 snaps over ridge 168 and ridge 168 is seated within groove 170. The fit between nut 164 and adapter 142 is sufficiently loose that nut 164 may be easily rotated relative to adapter 142 by hand. Nut 164 is thereby rotatably mounted on adapter 142. At least a portion of nut inside surface 174 is adapted to engage with at least a portion of the outside surface 131 of cam member 30 such that rotation of nut 164 relative to adapter 142 also rotates cam member 30 relative to splice holder 22. It should be understood that other methods of rotatably mounting nut 164 on adapter 142 known in the art may be used without departing from the scope of the invention. Preferably, nut 164 is rotated relative to adapter 142 with a tool (not shown) adapted for engagement with the outside surface of adapter 142.

Advantageously, individual components of the panel-mountable splice 10' of the embodiment illustrated in FIG. 20 may be assembled separately. For example, adapter 142 may be secured within the opening of a suitable panel, wall or bulkhead during an initial installation or construction period by inserting adapter 142 into panel opening 64 until tabs 58, which are biased inward by the insertion of adapter 142, clear the side of the panel 66 opposite the insertion side and snap back to their initial position, thus capturing the panel 66 between flanges 160 and tabs 58. Subassembly 176 comprising housing 136, splice holder 22, splice members 26, 28 and splice holder extension 24 may afterward be inserted into and engaged with adapter 142 by inserting subassembly 176 into opening 154. The insertion and retention of panel fiber 38 and the distribution fiber 40 are performed in substantially the same way as previously described. As subassembly 176 is inserted into adapter opening 154, latching arms 138 are simultaneously inserted into openings 158, whereupon latching arms 138 are biased inward, toward each other, by contact between the edges of openings 158 and latching arm hook portions 148. When latching arm hook portions 148 have cleared openings 158, latching arms 138 snap back to their initial position, securing subassembly 176 in adapter 142.

Subassembly 176 need only be engaged with adapter 142 when a connection between panel fiber 38 and distribution fiber 40 is required, thus allowing partial pre-assembly of the fiber splice by insertion of adapter 142 into panel opening 64 at an initial time, such as during panel installation, and final assembly of the splice at a later time by engaging subassembly 176 with adapter 142 and forming an optical connection between the panel fiber 38 and the distribution fiber 40, as previously described, at a later time. FIG. 24 shows a panel-mountable optical fiber splice 10' according to the present embodiment assembled and mounted in a panel with the use of adapter 142.

It will be apparent to those skilled in the art that various modifications and variations can be made to the present invention without departing from the spirit and scope of the invention. Thus it is intended that the present invention cover the modifications and variations of this invention provided they come within the scope of the appended claims and their equivalents.

What is claimed is:

1. A panel-mountable optical fiber splice comprising:
    a housing having first and second ends and defining a passageway extending longitudinally therebetween, the housing further defining at least one flange and fastener element for capturing a wall of a panel therebetween;
    a splice holder disposed within the passageway of the housing, the splice holder having first and second ends and defining a cavity extending longitudinally from the splice holder first end to an intermediate position within the splice holder;
    opposed first and second splice members disposed within the cavity of the splice holder;
    a cam member mounted on the splice holder and movable between an initial position allowing the first and second splice members to move apart to facilitate insertion of a first and second optical fiber between the first and second splice members, and a final position in which the cam member urges the first and second splice members toward each other to clamp the first and second optical fibers therebetween and;
    an adapter for mounting the housing in a panel, the adapter comprising at least one flange and a fastener element for capturing a wall of a panel therebetween, wherein the adapter comprises a nut rotatably mounted on the adapter for engaging with the cam member, such that rotation of the nut relative to the housing results in rotation of the cam member relative to the splice holder.

2. The panel-mountable optical fiber splice according to claim 1 further comprising a splice holder extension coupled to the splice holder.

3. The panel-mountable optical fiber splice according to claim 1 wherein one of the first and second splice members includes a longitudinal fiber aligning groove.

4. The panel-mountable optical fiber splice according to claim 3 wherein the first and second splice members are configured to allow the first optical fiber to be inserted axially between the first and second splice members such that an end of the first optical fiber is guided by the fiber aligning groove into abutment with an end of the second optical fiber at an intermediate position between the first and second splice members.

5. The panel-mountable optical fiber splice according to claim 1 wherein the housing comprises a recess for accommodating the fastener element.

6. The panel-mountable optical fiber splice according to claim 1 wherein the fastener element comprises at least one cantilevered tab extending from the fastener element, the cantilevered tab being sufficiently resilient such that when the tab is depressed from an initial position to a second position, the tab will return to the initial position when released.

7. The panel-mountable optical fiber splice according to claim 1 further comprising a key extending radially into the passageway of the housing for preventing rotation of the spice holder relative to the housing.

8. The panel-mountable optical fiber splice according to claim 1 wherein the housing comprises at least one latching arm extending therefrom for engagement with the adapter.

9. The panel-mountable optical fiber splice according to claim 8 wherein the at least one latching arm has a hook portion for engagement with the adapter.

10. The panel-mountable optical fiber splice according to claim 1 wherein the fastener element comprises at least one cantilevered tab extending from the fastener element, the cantilevered tab being sufficiently resilient such that when the tab is depressed from an initial position to a second position, the tab will return to the initial position when released.

11. The panel-mountable optical fiber splice according to claim 1 wherein the housing comprises a recess for accommodating the fastener element.

12. The panel-mountable optical fiber splice according to claim 1 further comprising an index matching gel disposed within the cavity of the splice holder.

13. The panel-mountable optical fiber splice according to claim 1 wherein the cam member comprises an index mark for indicating an orientation of the cam member.

* * * * *